United States Patent [19]

Germaine

[11] Patent Number: 4,828,309
[45] Date of Patent: May 9, 1989

[54] DEVICE FOR GRIPPING AND TRANSFERRING SEEDLINGS IN BLOCKS OF GROWING MEDIUM

[75] Inventor: Michel Germaine, Oissel, France

[73] Assignee: Gerplant Automation, Tourville-la-Riviere, France

[21] Appl. No.: 182,360

[22] Filed: Apr. 18, 1988

[30] Foreign Application Priority Data

Apr. 28, 1987 [FR] France .................. 8706031

[51] Int. Cl.⁴ .................. A01C 11/02; B25B 9/00
[52] U.S. Cl. .................. 294/100; 294/50.6; 294/115
[58] Field of Search ............. 294/100, 115, 88, 87.26, 294/50.6, 50.8, 87.22, 106; 81/345; D7/105

[56] References Cited

U.S. PATENT DOCUMENTS 4,130,314 12/1978 Storm .................. 294/100
4,623,184 11/1986 Houston .................. 294/100

FOREIGN PATENT DOCUMENTS 2578142 11/1985 France .

Primary Examiner—James B. Marbert
Attorney, Agent, or Firm—Oliff & Berridge

[57] ABSTRACT

Gripping device (1) comprising two blades (9) adapted to be moved downwards and upwards by a jack (6) and each guided by two guides (14, 15), one being an outer guide and the other an inner guide, and each blade having an outer boss (12) which brings the blades (9) close to one another at the end of the downward movement in order to pinch the block which is to be gripped and transferred.

Application: particularly for potting or planting out seedlings in blocks of friable material, for example compost.

8 Claims, 3 Drawing Sheets

DEVICE FOR GRIPPING AND TRANSFERRING SEEDLINGS IN BLOCKS OF GROWING MEDIUM

The present invention relates to a device for gripping and transferring seedlings in blocks of growing medium, particularly for the purpose of potting or planting.

Patent application WO No. 86/01975 (PCT/FR85/00274) discloses a gripping and transfer device comprising a support adapted to be moved between a position in which the block is gripped and a position in which the block is potted or planted, two gripping means of elongate shape mounted at a distance from and facing one another for displacement on said support, their free ends facing downwards, operating means acting on the other ends of the gripping means to displace the latter conjointly, relative to the support, in a vertical reciprocating movement between an upper inoperative position and a lower operative gripping position, and also means for guiding the gripping means on the support in such a manner that in the lower position the free ends of the gripping means are closer to one another than in the upper position.

In this known device the gripping means consist of two downwardly converging needles which are driven downwards into a block in the direction of their axes in order to grip the block, with the support in the gripping position. The support, together with the needles and the block, is then brought to the potting or planting position and the needles are thereupon withdrawn upwards in the direction of their axes in order to free the block.

This device gives very good results with blocks consisting of coherent materials, particularly the mineral wool used for so-called soilless culture. On the other hand, it is found that this device does not give complete satisfaction with blocks of more friable materials, for example compost, more particularly in cases where the roots of the seedling are well developed and tend to adhere to the honeycomb cells in which the blocks are situated. In this case either the blocks are not completely gripped or they are damaged.

The present invention relates to a device for gripping and transferring seedlings in blocks which is more particularly suitable for blocks of friable materials and/or blocks in which the seedlings have roots adhering to the honeycomb cells containing the blocks.

In the gripping and transfer device according to the invention the gripping means and the means guiding them are so designed that in the upper position the gripping means are substantially parallel and that they remain substantially parallel during the greater part of their upward and downward movements, while means are provided for acting on the gripping means at the end of the downward movement and at the beginning of the upward movement to bring their free ends close to one another towards the end of the downward movement, thereby applying a pinching action to the block, their free ends being moved apart at the beginning of the upward movement in order to terminate this pinching action.

Because the seedling is pinched in this way by the gripping means at the end of the downward movement, the block is seized more effectively than in the case of needles simply driven convergingly into the block, thus considerably reducing the risk that a block will remain attached in its cell or be damaged as the result of the gripping action during the movement of extraction from the cell.

Each gripping means may for example consist of a needle or similar component of substantially circular section, or of a plurality of parallel needles.

However, in order to improve the grip still further, it is advantageous for each gripping means to consist of a flat blade-like member, which is preferably tapered at its free end. The flat shape of a gripping means improves contact between the latter and the block, and the fact that the flat component is tapered at its free end nevertheless ensures that it will easily penetrate into the block, moving the roots away without substantially damaging them and without damaging the block.

In one embodiment of the invention each gripping means is provided between its two ends with an outwardly projecting boss, that is to say a boss projecting in the direction away from the associated gripping means, and has a substantially rectilinear shape between said boss and its free end. The guide means for the gripping means comprise a fixed outer guide disposed on the support in such a manner that the outer face of each gripping means always bears against said guide during the movement of the gripping means and that the boss on each gripping means encounters the said guide at the end of the downward movement of the gripping means, and then brings the free end of the latter closer to the free end of the associated gripping means.

It is therefore sufficient to impart to the gripping means a vertical reciprocating movement for the pinching movement of the gripping means at the end of their downward movement and the corresponding opening movement of the gripping means at the beginning of their upward movement to be brought about automatically through the cooperation of the boss on each gripping means with the associated outer guide.

In order to hold each gripping means in contact with its outer guide it is possible to make the gripping means of an elastic material and to mount it, at its end opposite the free end, in such a manner that it is permanently held elastically in contact with said guide.

For the purpose of eliminating or at least reducing friction and wear to which each gripping means is subject through contact with its outer guide, and in order to improve the pinching action and reduce the risk of movement of the gripping means away from one another through elasticity when loads occur between a block and the elastic gripping means pinching it, it is advantageous for each gripping means to be made of rigid material in such a manner that it has a hollow on the inner side at the point where said outwardly projecting boss is formed, to provide an articulation between each gripping means and the means for operating the latter, and to supplement the fixed outer guide for each gripping means with a fixed inner guide disposed on the support in such a manner that the inside face of each gripping means, facing the associated gripping means, also always bears against said inner guide.

Each gripping means is thus simultaneously guided externally and internally, so that the pinching movements and the movements of the associated gripping means away from one another are positively achieved solely through the action of the downward and upward movements of these means which are brought about by the operating means.

The operating means for the gripping means may advantageously consist of a common operating member, preferably a pneumatic jack, acting on the two associated gripping means, preferably through the medium of a common mounting on which the two gripping means are articulated.

In order to avoid the danger that the leaves of the seedlings may be jammed between the gripping means and the guide means for the latter, it is advantageous for the gripping device to be provided with a guard plate covering the guide means, without hindering the movement of the gripping means.

A more detailed description will be given below, with reference to the accompanying schematic drawings, of one illustrative and non-limitative form of construction of the device according to the invention, in which drawings.

Figure 1:
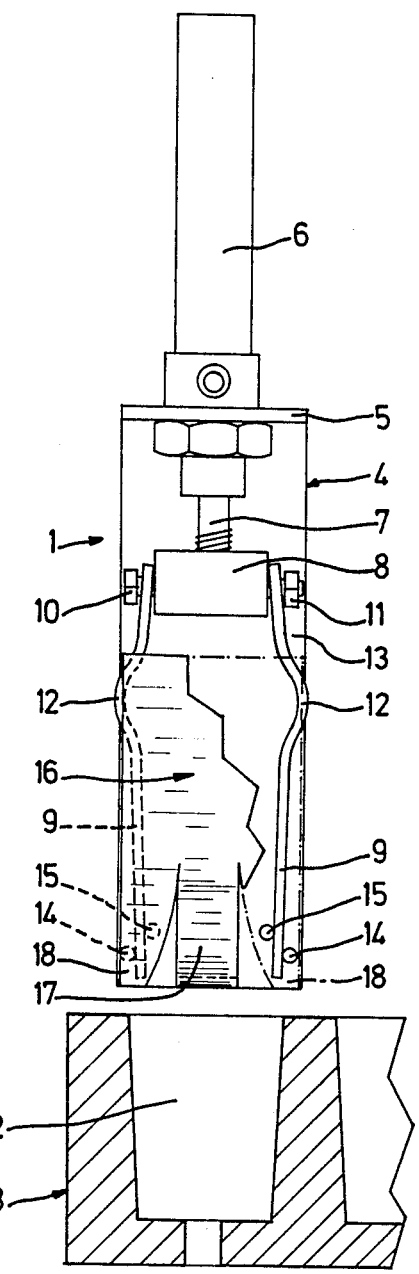
FIG. 1 is a front view of a gripping device according to the invention, in which the gripping means are shown in the inoperative position.

The gripping device 1 as illustrated in the drawings is intended for gripping a block of compost or similar material carrying a seedling (not shown) and disposed for example in a cell 2 in a honeycomb-like plate 3 of the type usually utilized for horticultural and market-gardening purposes, each cell 2 receiving a block serving as germination support for a seed and as growing medium for the seedling resulting from the germination of said seed. The gripping device 1 is for example used for transferring the block from the plate 3 to another culture medium, for example to a larger pot (repotting) or to an open-air cultivation plot (planting).

For the sake of clarity neither the block which is to be gripped nor the seedling carried by the block is shown in the drawings.

The gripping device 1 comprises an elbowed support 4, for example of sheet metal, whose horizontal top arm 5 carries on its upper face a pneumatic jack 6 whose piston rod 7 passes downwards through the arm 5. On the free end of the piston rod 7 is screwed a mounting 8 carrying two flat blades 9 pivoted on two opposite sides of the mounting 8. In the example illustrated the mounting 8 is provided with a horizontal through hole receiving a screw 10 which also passes into holes provided at one end of the blades 9, a self-locking nut 11 being engaged on the free end of the screw 10 without being tightened against the mounting 8, so that the two blades 9 are pendularly pivoted face to face on the two opposite sides of the mounting 8.

Figure 2:
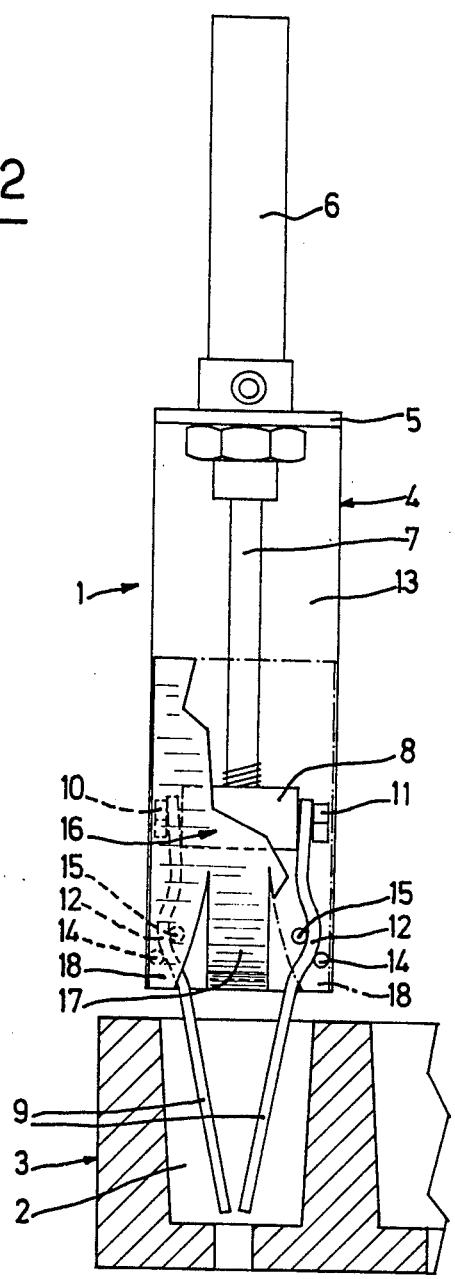
FIG. 2 is a view corresponding to that shown in FIG. 1, showing the gripping means in the operative position.

As can be seen in FIGS. 1 and 2, each blade 9 has a rectilinear general shape but, a short distance under its top end, is provided with a boss 12 facing outwards, that is to say away from the other blade 9, and with a corresponding hollow on the inside face.

Near its bottom end the vertical arm 13 of the support 4 carries two pairs of guide rods 14, 15 projecting at right angles to the arm 13 of the support 4, in the same direction as the arm 5. The two guide rods 14, 15 of each pair are so disposed as to frame and guide a blade 9 on the outside and inside, the outer guide rod 14 of each pair being in contact with the outer face of the blade 9 and the guide rod 15 being in contact with the inner face of the same blade. The positions of the guide rods 14, 15 of each pair are such that when the blades 9 are in the upper position, that is to say in the inoperative position, above a cell 2 (FIG. 1), the blades 9 are slightly offset towards the interior in relation to the upward extension of the opposite side walls of the cell 2 and are directed substantially parallel to said walls of the cell.

Finally, the gripping device is provided with a guard plate 16, which extends in front of the arm 13 of the support 4 in such a manner as to cover, in particular, the guide rods 14, 15. This guard plate 16 is fixed at its bottom end to the bottom end of the arm 13 of the support 4 by means of a centre branch 17, and has two side strips 18 which cover the guide rods 14, 15.

Figure 3:
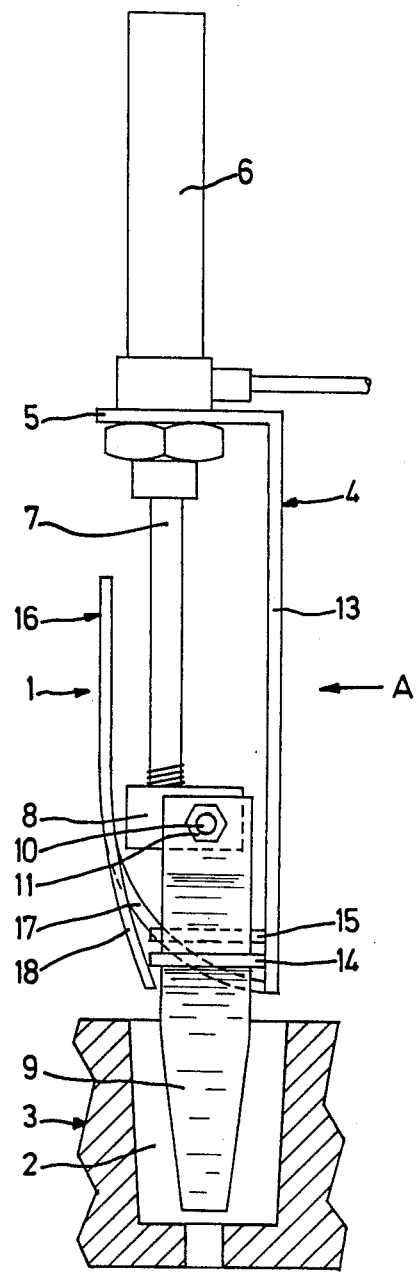
FIG. 3 is a side view of the gripping device with the gripping means shown in the operative position, as in FIG. 2.

In order to take hold of a seedling in a cell 2 in the plate 3 and to transfer it, the gripping device 1, with its blades 9 retracted to the upper position as shown in FIG. 1, is placed above the plate 3, to the rear of the cell 2 in question, and is then moved horizontally in the direction of the arrow A in FIG. 3, with the guard plate 16 facing forwards, to the block gripping position in which the blades 9 are situated above the cell containing the block which is to be picked up. This horizontal approach movement has the effect that the leaves of the seedling which is to be picked up are pushed back by the guard plate 16 and that there is no danger of these leaves being crushed, which would happen if the gripping device 1 were simply lowered over the cell 2 containing the seedling which is to be gripped.

The jack 6 is then operated to lower the blades 9 into the cell 2. During this downward movement the blades 9 are first driven into the block contained in the cell 2, close to the outer edge of the block, following a substantially rectilinear path substantially parallel to the opposite walls of the cell 2. When the free ends of the blades 9 have come to within a short distance from the bottom of the cell 2, the bosses 12 of the blades 9 come into contact with the guide rods 14, thus bringing the two blades 9 close to one another and causing them to apply a pinching action to the block (FIG. 2).

When the block is thus pinched by the two blades 9, which have reached the end of their downward movement, the entire gripping device is raised in order to extract from the cell 2 the block gripped by the blades 9, and the gripping device 1, together with the block, is then transferred to a reception site for the purpose of potting or planting out the seedling.

When the seedling in its block, which is still suspended from the blades 9, has been brought to the potting or planting position and driven into the growing medium in which it is to be potted or planted out, the jack 6 is operated in the opposite direction to raise the blades 9. At the beginning of this upward movement the blades 9 are first moved apart through the action of the inner guide rods 15 when the bosses 12 on the blades 9 move away from the outer guide rods 14, whereupon the pairs of guide rods 14, 15, cooperating with the rectilinear portion of the blades 9, guide the latter rectilinearly for the remainder of the upward movement as far as the position shown in FIG. 1.

The movements of the entire gripping device 1 between the gripping position and the reception position, and vice versa, are made with the aid of means (not shown) on which the entire gripping device is mounted by the support 4. These means are not shown in the drawings because they do not form part of the present invention.

It should be noted that the gripping device as described and illustrated may undergo numerous modifications and variations within the scope of the invention.

Thus, each blade 9 may for example be replaced by a needle or even a plurality of parallel needles. In addition, instead of being pivoted on a common mounting 8 the two blades 9 could be made of elastic material and be rigidly fixed to a mounting 8 in such a manner as to be urged elastically in the direction away from one another. In this case it would be sufficient to provide outer guide rods 14 to bring about the pinching movement, while the movement of the blades 9 away from one another would be achieved through the elasticity of these blades, without the aid of guide rods.

In this case it would also be possible to make the two blades 9 in a single U-shaped piece.

I claim:

1. Device for gripping and transferring seedlings in blocks of growing medium, for the purpose of potting or planting, which comprises a support adapted to be moved to a block gripping position and to a block potting or planting position, two gripping means of elongate shape mounted at a distance from and facing one another for displacement on said support, their free ends facing downwards, operating means acting on the other ends of the gripping means to displace the latter, relative to the support, conjointly and in a downward and upward reciprocating movement between an upper inoperative position and a lower operative gripping position, and means for guiding the gripping means on the support in such a manner that in the lower position the free ends of the gripping means are closer to one another than in the upper position, characterized by the fact that the gripping means and the guide means for the gripping means are so designed that during the greater part of their downward and upward movement the free ends of the gripping means remain substantially the same distance apart and that means are provided to act on the gripping means at the end of the downward movement and at the beginning of the upward movement to bring their free ends close to one another towards the end of the downward movement for the purpose of pinching the block and to move them apart at the beginning of the upward movement for the purpose of terminating the pinching.

2. Device according to claim 1, characterized by the fact that each gripping means is provided between its two ends with a boss projecting outwards in the direction away from the associated gripping means, and has a substantially rectilinear shape between said boss and the free end, and that for each gripping means the guide means comprise a fixed outer guide disposed on the support in such a manner that the outer face of each gripping means always bears against said guide during the upward and downward movement of the gripping means and that the boss of the gripping means encounters said guide at the end of the downward movement of the gripping means and then brings the free end of the latter closer to the free end of the associated gripping means.

3. Device according to claim 1 or 2, characterized by the fact that each gripping means consists of a blade.

4. Device according to claim 3, characterized by the fact that each blade is tapered at its free end.

5. Device according to claim 4, characterized by the fact that the two blades are connected to a common mounting.

6. Device according to claim 2, characterized by the fact that each gripping means is made of an elastic material and bears elastically against said outer guide.

7. Device according to claim 2, characterized by the fact that each gripping means is made of a rigid material and has on its inner face a hollow at the site of said boss, that an articulation is provided between each gripping means and the operating means and that the guide means additionally comprise a fixed inner guide disposed on the support in such a manner that the inner face of each gripping means always bears against said inner guide.

8. Device according to claim 1, characterized by the fact that it is provided with a guard plate covering the guide means.

* * * * *